US006577868B1

United States Patent
Vialen et al.

(10) Patent No.: US 6,577,868 B1
(45) Date of Patent: Jun. 10, 2003

(54) METHOD AND SYSTEM FOR PERFORMING HANDOVER IN A MOBILE COMMUNICATION SYSTEM

(75) Inventors: Jukka Vialen, Helsinki (FI); Mikko J. Rinne, Helsinki (FI); Oscar Salonaho, Helsinki (FI); Niina Laaksonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/638,677

(22) Filed: Aug. 15, 2000

Related U.S. Application Data

(63) Continuation of application No. PCT/EP98/00866, filed on Feb. 16, 1998.

(51) Int. Cl.[7] .............................. H04Q 7/20; H04Q 7/00
(52) U.S. Cl. ...................... 455/441; 455/442; 370/331
(58) Field of Search ................................. 455/442, 441, 455/525, 437, 522, 343, 38.3, 502, 436; 370/331, 332

(56) References Cited

U.S. PATENT DOCUMENTS

| | | | | |
|---|---|---|---|---|
| 5,613,205 A | * | 3/1997 | Dufour | 455/440 |
| 5,715,516 A | * | 2/1998 | Howard et al. | 455/422 |
| 5,960,347 A | * | 9/1999 | Ozluturk | 455/442 |
| 6,097,954 A | * | 8/2000 | Kumar et al. | 455/442 |
| 6,151,502 A | * | 11/2000 | Padovani et al. | 455/442 |
| 6,173,181 B1 | * | 1/2001 | Losh | 455/434 |

FOREIGN PATENT DOCUMENTS

| | | |
|---|---|---|
| EP | 0 426 269 A1 | 5/1991 |
| EP | 0 577 959 A1 | 1/1994 |
| EP | 0 660 632 A2 | 6/1995 |
| GB | 2 295 943 A | 6/1996 |

OTHER PUBLICATIONS

F. Tonbul et al, *Distributed Hand–Off Scheme for ATM–based Beacon Type Intelligent Vehicle Communication Systems, Vehicular Technology Conference, Mobile Technology for the Human Race Atlanta*, Apr. 28, 1996, pp. 1530–1534, XP 000595789.

Marsan, et al, *"Local and Global Handovers for Mobility Management in Wireless ATM Networks"*, IEEE Personal Communications, Oct., 1997, pp. 16–29, XP 000721302.

* cited by examiner

*Primary Examiner*—Edward F. Urban
*Assistant Examiner*—Sheila Smith
(74) *Attorney, Agent, or Firm*—Squire Sanders & Dempsey LLP

(57) ABSTRACT

A method and system for performing a pre-reserved handover in a mobile communciation system is suggested, wherein an additional handover preparation step is performed by determining at least one candidate base station in advance, to which handover is likely to be performed. An additional downlink connection to the at least one candidate base station is established before handover execution is performed. Thereby, proper handover can be ensured for cell environments in which a serving cell disappears very quickly from a mobile station.

22 Claims, 5 Drawing Sheets

METHOD AND SYSTEM FOR PERFORMING HANDOVER IN A MOBILE COMMUNICATION SYSTEM

This is a continuation of PCT/EP98/00866 filed Feb. 16, 1998.

FIELD OF THE INVENTION

The present invention relates to a method and system for performing handover in a cellular mobile communication system.

BACKGROUND OF THE INVENTION

In a mobile telephone system like the GSM network, a telephone call is usually transmitted to a mobile station (MS) via a fixed network (Public Switched Telephone Network, PSTN), a mobile switching center, one of a plurality of radio network controllers (RNC, in GSM known as base station controllers BSC) and one of a plurality of base stations (BS). Therein, every individual base station serves a predetermined cell area.

In case a mobile station moves across a cell border between adjacent base stations, the current set of services associated with the mobile station have to be transferred from the current serving base station to a new serving base station. Such an operation is called "handover".

FIG. 1 schematically shows a known handover processing in a mobile communication system comprising a mobile station MS, two adjacent base stations BS1 and BS2, a switching means 4 for switching a telephone call from a connected network element to one of the two adjacent base stations, and a switching control means (RNC) 5 for controlling the switching operation. In the context of this application, the concept "network element" refers to any element of the mobile telecommunication system excluding the mobile station MS.

In the above known system, handover processing information is transmitted from the currently serving base station BS1 to the adjacent base station BS2 via the switching means 4 (cf. broken arrows in FIG. 1), when the mobile station MS moves across a corresponding cell border. To achieve this, a broadcast control channel (BCCH) is provided, by means of which the mobile station MS may detect the BS with the strongest signal.

In urban environments, the field strength of radio reception varies to a large extent due to multipath propagation and the lack of a line of sight. Thus, small cell sizes, i.e. micro/pico-cells, have to be provided so as to assure proper reception of radio signals.

However, a connection-with the current serving base station BS1 may get lost very quickly in such a micro/picocell environment. This is very likely in the case of fast-moving mobile stations like cars which often suddenly change their moving directions at crossings, such that bearers of a mobile station cannot be properly handed over to the new base station BS2.

In this respect, the term bearer refers to a service realized on a radio interface. A radio bearer can be seen as a realization of the service, i.e. from layer 3 in the fixed network to the corresponding protocol in, the MS. Thus, layer 3 provides radio bearers as services: t higher layers of the connection layer model.

It is therefore an object of the present invention to provide a method for performing handover which ensures proper execution in microcell environments.

This object is achieved by a method for performing handover, comprising the steps of:
 determining at least one candidate base station to which a mobile station is likely to be handed over; and
 setting up an additional connection from a network element to said at least one candidate base station before executing handover.

Additionally, this object is achieved by a system for performing handover in a mobile communication system, comprising:
 control means for determining at least one candidate base station to which a mobile station is likely to be handed over; and
 switching means for setting up an additional connection from a network element to said at least one candidate base station before executing handover.

Accordingly, by determining candidate base stations and setting up additional connections from a network element to the candidate base stations in advance, a point-to-multipoint downlink data flow can be established to both the current serving base station and the determined candidate stations before the handover is executed. This pre-initialized handover ensures that handover processing data is available to all candidate stations, so that a proper handover is possible even in case of sudden interruptions of the connection with the current serving base station.

The determination step may be performed by means of a handover prediction on the basis of a moving direction and/or speed of the mobile station.

Base stations which are in a line-of-sight of the current serving base station do not have to be determined as candidate base stations, since a pre-reserved handover is not required.

Preferably, a list for identifying said at least one candidate base station can be transmitted to a switching control means in order to establish the required additional connections.

Moreover, mobile station connection parameters required for the connection with the mobile station can be transmitted to the switching control means, wherein a point-to-multipoint connection is set up to the current serving base station and the corresponding candidate base station(s). The mobile station connection parameters required for the possible handover can be transmitted to the candidate base station(s).

Furthermore, downlink user data transmitted through said point-to-multipoint connection could be buffered in the candidate base station(s), such that data loss during handover can be prevented.

Additionally, the candidate list can be updated by a current serving base station by checking whether said prediction is still valid. The connection parameters of valid candidate base station are transmitted to the mobile station.

In case of any change of connection parameters such as a bearer quality of service (QoS), connection parameter change information can be transmitted to said candidate base station(s) so as to ensure a proper handover execution.

In addition, a connection parameter version number can be transmitted to a candidate base station to which handover execution is to be performed and a connection parameter update is performed in dependence on the transmitted version number. Thereby, the connection parameters of the candidate base station can be adapted to those of the mobile station upon handover execution.

Upon handover execution, an established connection between a previous serving base station and the mobile station can be deleted, when a predetermined period expires without any attempt of the mobile station to contact the previous serving base station.

BRIEF DESCRIPTION OF THE DRAWINGS

In the following, the present invention will be described in greater detail on the basis of a preferred embodiment with reference to the accompanying drawings in which.

DESCRIPTION OF THE PREFERRED EMBODIMENT

The following preferred embodiment relates to a method and system for performing handover in a Universal Mobile Telephone System (UMTS) and will be described on the basis of an explanatory situation shown in FIG. 2.

Figure 1:
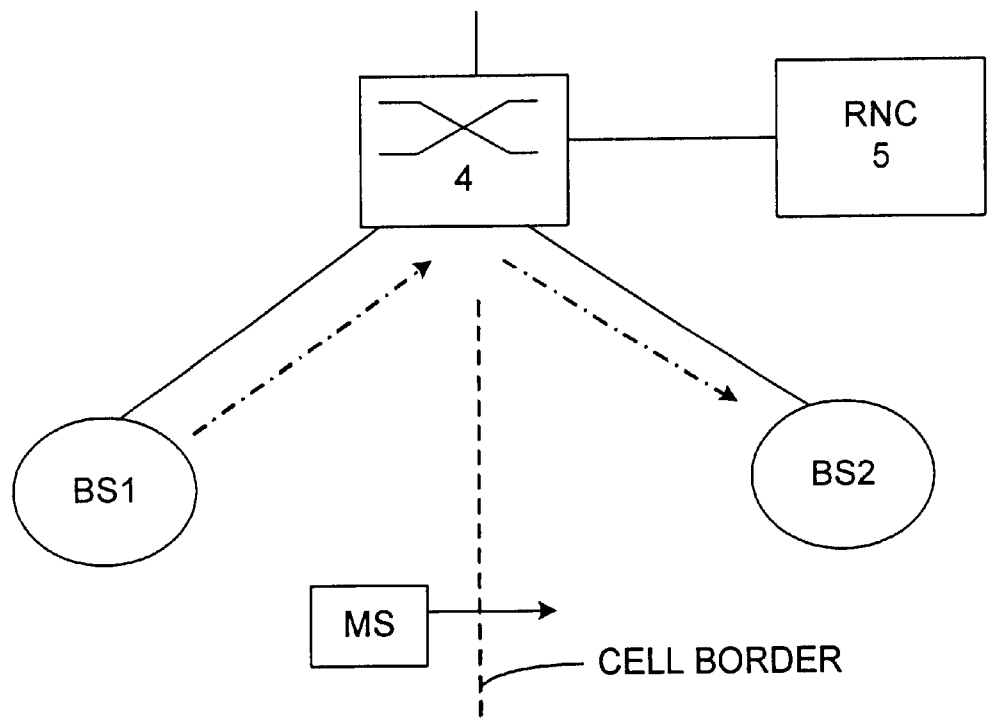
FIG. 1 shows a schematic view for explaining a prior art handover processing in a cellular mobile telecommunications system.
Figure 2:
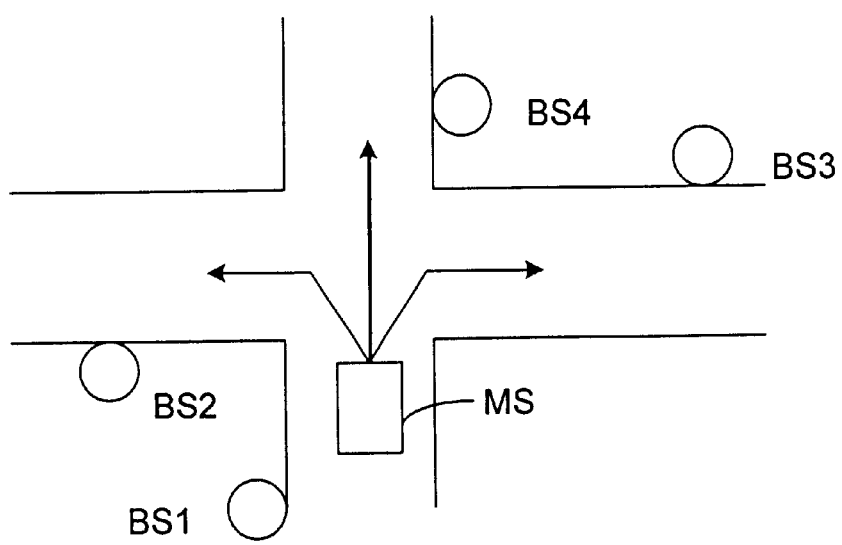
FIG. 2 shows an explanatory situation of a mobile station within a microcell environment comprising four base stations.

According to FIG. 2, a mobile station MS is approaching a road crossing within a microcell environment comprising four base stations BS1 to BS4 located near the crossing. The current serving base station is BS1. The mobile station MS can already detect the BCCH of the base station BS4 but not the BCCHs of the base stations BS2 and BS3, since they are not in the current line-of-sight of the mobile station MS.

Figure 3:
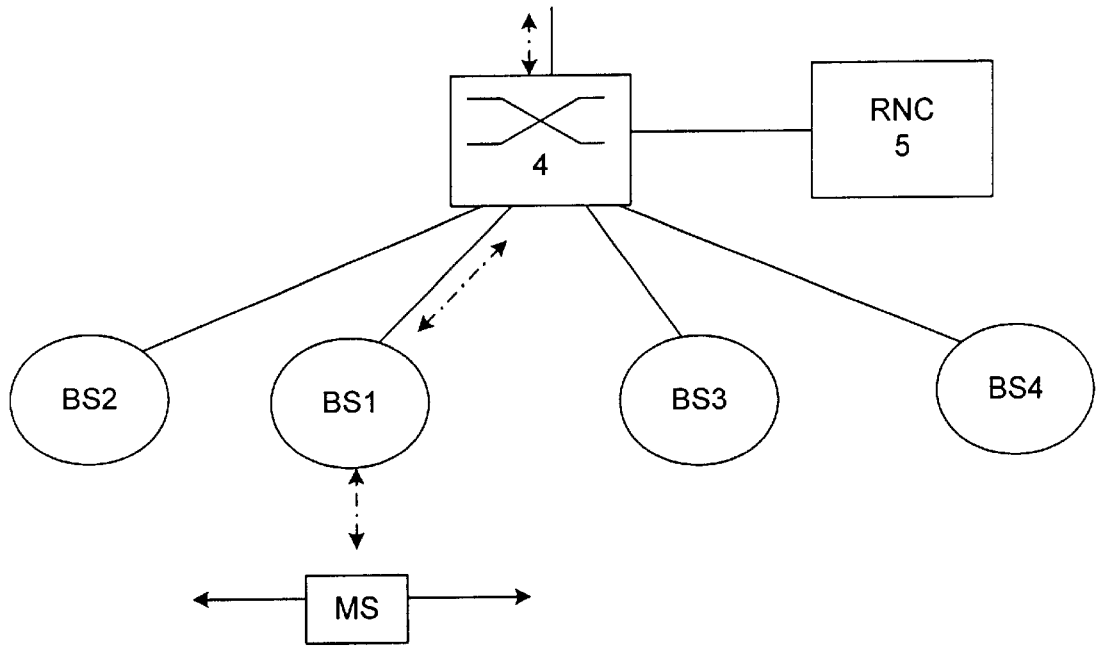
FIG. 3 shows a schematic view of a cellular mobile telecommunications system and a dataflow according to the explanatory situation of FIG. 2.

FIG. 3 shows a schematic view of the corresponding mobile telephone system, wherein the four base stations BS1 to BS4 are connected to the switching means 4 which is controlled by the switching control means (RNC, Radio Network Controller) 5. The simplified switching means 4 may be an asynchronous transmission mode switch (ATM switch) and may consist of a chain of switches connected to each other. The RNC 5 is connected to the switching means 4 or may be a part of the switching means 4, wherein the user data flow or traffic does not flow through the RNC 5.

The current data flow from the switching means 4 to the mobile station MS (downlink) and from the mobile station MS to the switching means 4 (uplink) is indicated by a corresponding dash-dot arrow. Since the base station BS1 currently serves the mobile station, up- and downlink data flow is performed via the switching means 4 and the base station BS1.

In the present explanatory situation according to FIG. 2, the base station BS1 determines that the mobile station MS is moving towards the base station BS4 but cannot know whether it turns towards one of the base stations BS2 or BS3.

According to the present invention, handover processing is therefore divided into two phases, i.e. a handover preparation phase and a handover execution phase.

Figure 5:
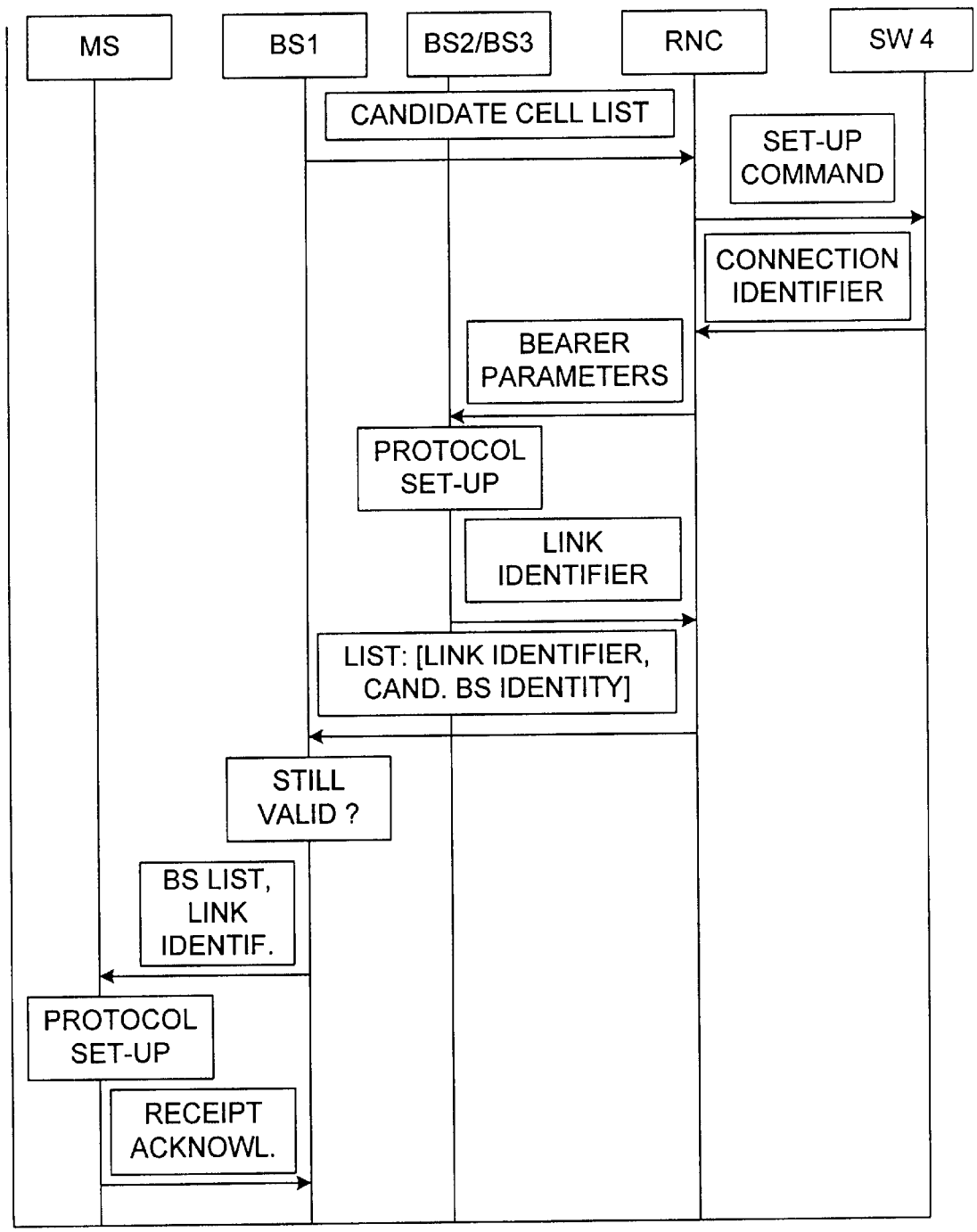
FIG. 5 shows a flow diagram of a handover preparation processing according to the preferred embodiment of the present invention.

FIG. 5 shows a flow diagram of the handover preparation phase, wherein respective information flows between the components of the mobile communication system are indicated by horizontal arrows with corresponding boxes specifying the kind of information. The respective arrows point from the source component of the information to the sink component. The vertical dimension represents the time axis, such that a lower information flow is executed after an upper information flow.

In the present case, mobile originated handover (MOHO) is assumed, which means that the mobile station makes the final decision of handover triggering. However, this is not an essential requirement of the present invention.

To improve handover processing, it is assumed that the base station BS1 knows the current speed and likely directions of the mobile station MS. Moreover, it is assumed that the mobile station knows the BCCH carrier frequency and the exact location of at least one access slot of a candidate base station.

In the handover preparation phase, an algorithm provided in the current serving base station BS1 triggers handover preparation when there is sufficient indication that a handover to one of the non-line-of-sight base stations BS2 and BS3 is likely to follow. The above indication can be derived from a prediction technique based on a self-organizing-map neural network (SOM neural network) or any other suitable prediction method.

According to FIG. 5, the current serving base station BS1 sends a candidate neighbour cell list comprising identifiers (BS-id) of candidate neighbour base stations to the RNC 5, after it has determined the moving direction of the mobile station MS. In the present case according to FIG. 2, the candidate cell list consists of identifiers for the base stations BS2 and BS3. In view of the fact that the base station BS4 is in the line-of-sight of the base station BS1, the handover preparation processing is not required for this base station.

Additionally, the base station BS1 may transmit to the RNC 5 a mobile station identifier (MS-id), a set of hardware parameters (MS-PAR) characterizing the mobile station MS and needed by the new serving base station to determine a possible physical channel allocation pattern for the mobile station MS, and layer 2 parameters (BS-L2_info) of active radio bearers (LLC/RLC). An active radio bearer is a radio bearer which is currently transmitting data.

The switching control means RNC 5 knows the identities of fixed traffic bearers between a network element, such as the switching means 4, and the base station BS1. The RNC 5 commands the switching means 4 to set up a point-to-multipoint connection to all candidate base stations of the candidate cell list. However, the RNC 5 may drop some base stations in accordance with own traffic measurements.

Moreover, a reservation to new base stations is required for actively transmitting bearers with restricted delays, wherein the RNC 5 selects those bearers from the provided layer 2 information (BS_L2_info) that need pre-reservation for handover.

Any protocol may be used for performing switching control, e.g. ATM GigaSwitch (trademark of the company DEC), GSMP (General Switch Management Protocol) or SNMP (Simple Network Management Protocol).

The switching means 4 returns to the RNC 5 virtual path and connection identifiers (VCI2, VCI3) for the candidate base stations BS2 and BS3.

Figure 4:
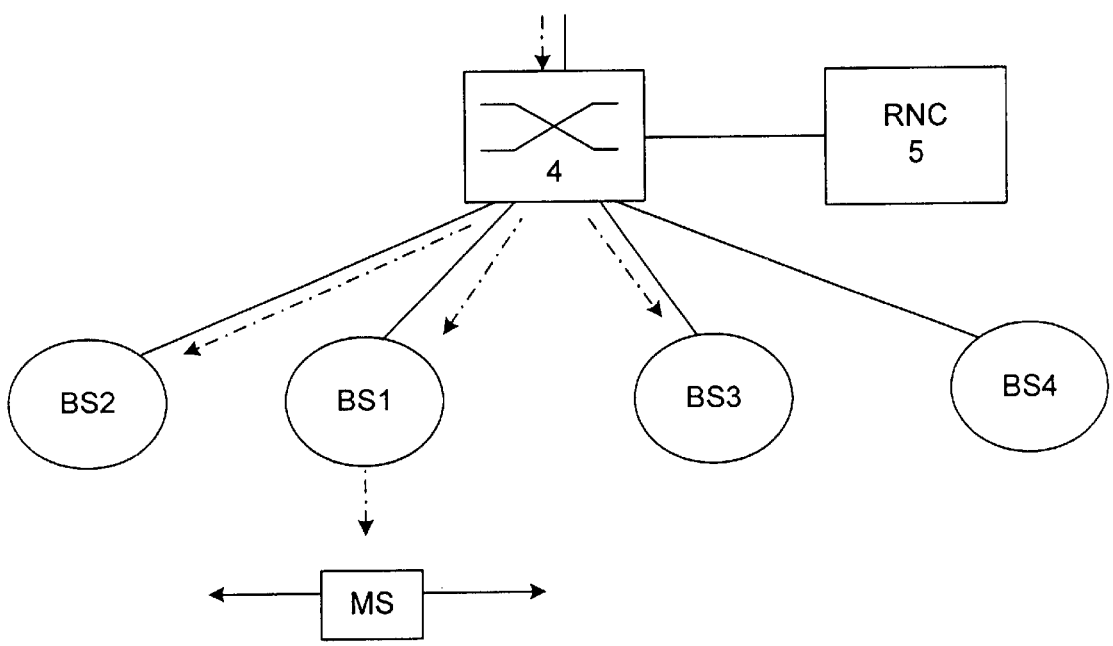
FIG. 4 shows a schematic view of a pre-initialized point-to-multipoint data flow according to the present invention in the cellular mobile telecommunications system of FIG. 3.

After the point-to-multipoint connection has been established, user data from a calling party flows in a downlink direction not only to the current serving base station BS1 but also to the candidate base stations BS2 and BS3, as shown in FIG. 4.

At the candidate base stations BS2 and BS3, the incoming user data is stored in buffer memories, so that the buffer size needs to be large enough to accomodate an amount of data which is transmitted during a maximum transmission delay defined by the QoS (Quality of Service) parameters of each bearer. The buffer memory may preferably comprise FIFO memories (first-in-fist-out), wherein overflow data may simply be discarded. If, however, a high reliability handover is desired, larger buffer memories and a higher initial data rate to the candidate base stations BS2 and BS3 can be provided.

Subsequently, the RNC 5 informs the candidate base stations BS2 and BS3 of the pre-reserved fixed bearers (VCI-list) to which the radio bearers have to be connected. A fixed bearer is a bearer realized in the fixed network, i.e. down to the base station. Parameters of the mobile station MS, which the RNC 5 received from the current base station BS1 and which include the mobile station identifier (MS-id), the set of hardware parameters (MS-PAR) characterizing the mobile station MS and the layer 2 parameters, are also transmitted.

Thereafter, the candidate base stations BS2 and BS3 set up protocol entities (Radio Bearer Control (RBC), Logical Link Control (LLC) and Radio Link Control (RLC)) for the radio bearers and start receiving traffic from the switching means 4.

In the next step, the candidate base stations BS2 and BS3 return the mobile station identifier (MS_id) received from the current serving base station BS1 and newly allocated layer 2 link identifiers (TLLI2, TLLI3), used for identifying their link to the mobile station MS, to the RNC 5.

The RNC 5 forwards to the current serving base station BS1 the received new link identifiers (TLLI2, TLLI3) and the base station identifiers (BS2_id, BS3_id) of the candidate base stations BS2 and BS3 together with the mobile station identifier (MS_id) as received from the current serving base station BS1.

The current serving base station BS1 now checks whether the handover estimation is still valid. As a result, the current candidate list may be changed in case of any change in the parameters of the corresponding mobile station MS, i.e. speed or direction.

Subsequently, the current serving base station BS1 informs the mobile station MS of the candidate base stations BS2 and BS3 for the handover processing by transmitting a list of identifiers (BS2_id, BS3_id) of the candidate base stations BS2 and BS3 and the link identifiers (TLLI2, TLLI3) reserved at the candidate base stations BS2 and BS3.

After receiving the base station and link identifiers of the candidate base stations BS2 and BS3, the mobile station MS sets up protocol entities (RBC, LLC and RLC) for a control bearer for a new serving base station and subsequently acknowledges the receipt of the candidate base station list and the corresponding link identifiers. This terminates the handover preparation processing.

However, a change in the QoS parameters of the bearer of the mobile station MS might occur after the handover preparation.

Figure 6:
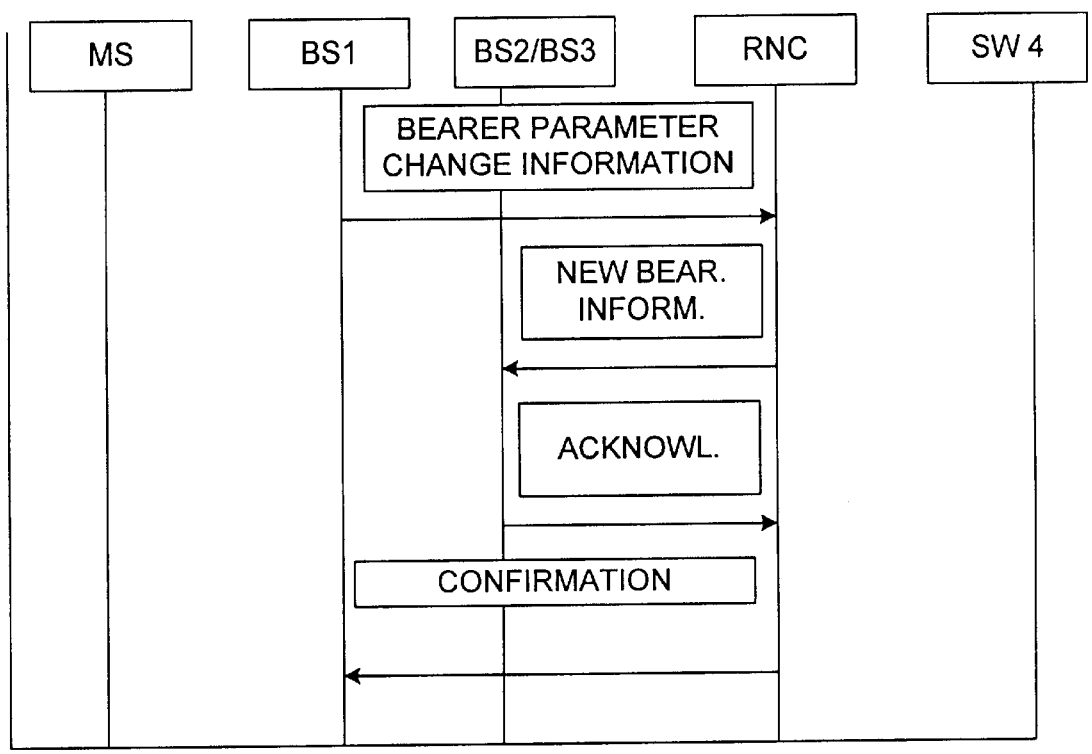
FIG. 6 shows a flow diagram of a radio bearer QoS parameter change processing according to the preferred embodiment of the present invention.

In this case, the processing shown in FIG. 6 is performed.

The current serving base station BS1 informs the RNC 5 that the layer 2 parameters of the active bearers have changed and transmits the mobile station identifier (MS_id), new layer 2 parameters (BS_L2_info) of the active radio bearers (LLC, RLC), a version number (BS-L2_v) for the previous parameters and the identifiers (BS2_id, BS3_id) of the candidate base stations BS2 and BS3. Instead of the new layer 2 parameters, the current serving base station may transmit only a change report.

The RNC 5 forwards the received new radio bearer information (layer 2 parameters) together with the mobile station identifier (MS_id) and the version number (BS-L2_v) to the candidate base stations BS2 and BS3, whereafter the candidate base stations BS2 and BS3 acknowledge the received change message while referring to the corresponding mobile station identifier (MS_id).

Finally, the RNC 5 confirms to the current serving base station BS1 that all candidate base stations BS2 and BS3 have received the changed layer 2 information, while referring to the mobile station identifier (MS_id).

Figure 7:
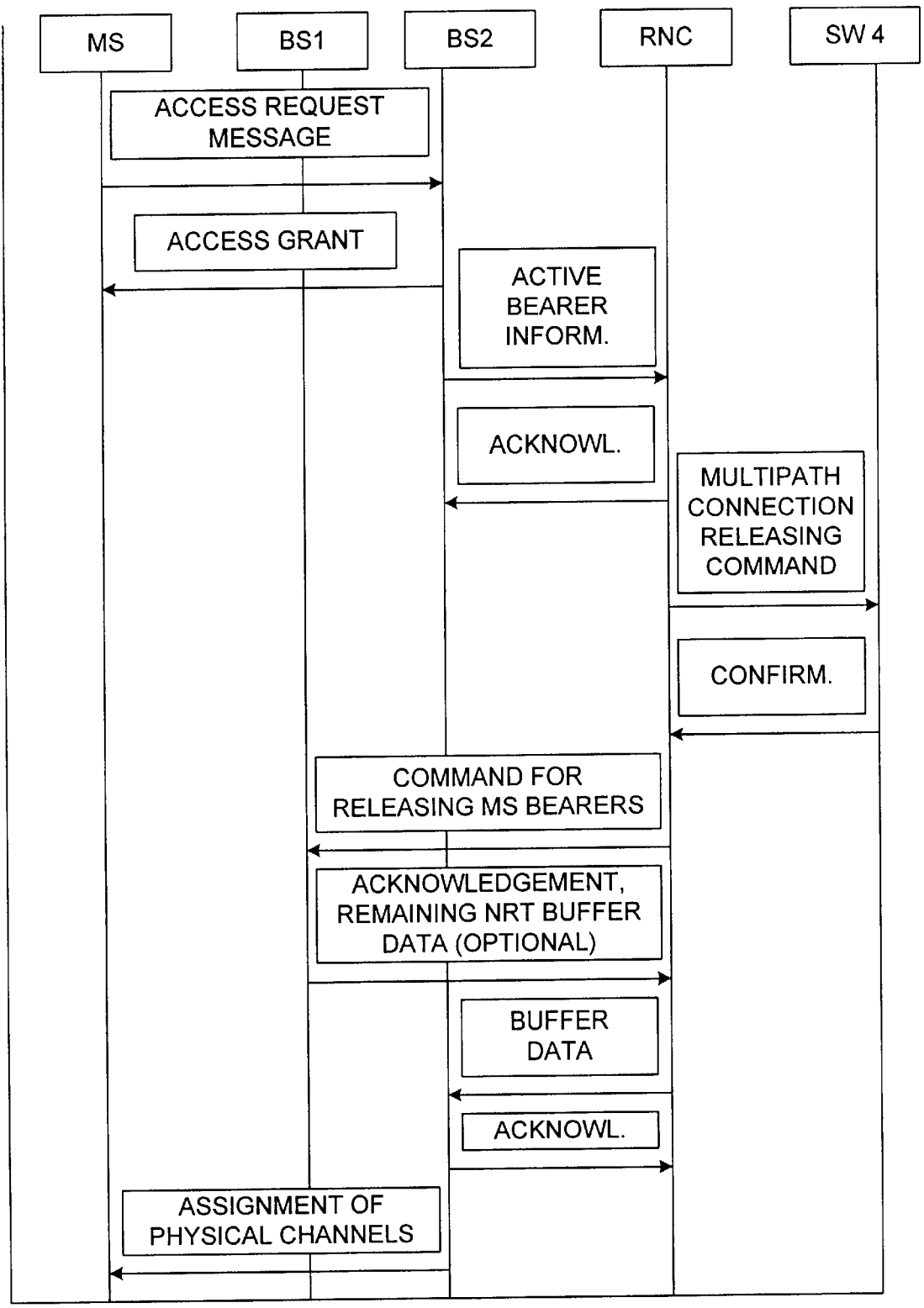
FIG. 7 shows a flow diagram of a handover execution processing according to the preferred embodiment of the present invention.

FIG. 7 shows a flow diagram of a handover execution processing following the above described handover preparation.

In case of the above mentioned mobile-originated handover, a handover algorithm may be provided in the mobile station MS, by means of which a decision is made as to the actual handover switching timing.

After the decision of execution has been made, the mobile station MS sends an access message to the new serving base station BS2 which is assumed to have been selected. In addition thereto, the mobile station MS transmits the link identifier (TLLI2) and a last version number (MS_L2_v) for its layer 2 QoS parameters.

In case the version number (MS_L2_v) of the mobile station MS is higher than the version number (BS_L2_v) of the new serving base station BS2, it is assumed that the new serving base station BS2 either has not yet received the QoS change report or it has been lost. The new serving base station BS2 will thus request the report from the base station BS1, report its layer 2 version number (BS_L2_v) to the mobile station MS with reference to the link identifier (TLLI2) and continue to wait for the new report to arrive. The mobile station MS starts a timer. If the timer expires and the report has not arrived, the mobile station MS performs a layer 2 bearer set-up on a dedicated channel using the control bearer.

In case the version numbers (BS_L2_v and MS_L2_v) match, the new serving base station BS2 acknowledges the receipt of the access message with an access grant message and transmits the link identifier (TLLI2), a bearer identifier (bearer_id), a physical downlink channel (ph_dn_rt) for reporting slot allocations for bearers and a physical uplink channel (ph_up_rt) for acknowledgements of the reports.

Subsequently, the new serving base station BS2 informs the RNC 5 that a radio bearer has successfully been set up. This message is acknowledged by the RNC 5.

Thereafter, the RNC 5 commands the switching means 4 to release unnecessary point-to-multipoint connections while referring to the corresponding virtual connection identifiers (BS1_VCI-list).

The release command is confirmed by the switching means 4 with reference to the corresponding virtual connection identifiers (BS1_VCI-list).

Thus, the RNC 5 commands the former serving base station BS1 to release radio bearer transmission to the mobile station MS while referring to the corresponding mobile station identifier (MS_id).

The former serving base station BS1 acknowledges the termination of radio bearer to the mobile station MS and optionally sends unused data from its NRT (Non-Real-Time), bearer buffers while referring to the corresponding mobile station identifier (MS_id). NRT bearers have no delay restrictions such that the bearer data rate can be varied by the radio interface. The unused data relates to untransmitted LLC- and RLC-PDUs (Protocol Data Units) and correctly completed RLC-PDUs which cannot yet be formed into an LLC-PDU.

Subsequently, the RNC 5 forwards the unsent data to the new serving base station BS2 while referring to the corresponding mobile station identifier (MS_id). This is acknowledged by the new serving base station BS2.

In the base stations, a timer may be provided for counting a time period until the RNC 5 confirms the termination of the connection. Thus, if the timer of the former serving base station BS1 expires without any confirmation of the RNC 5 and without any attempt of the mobile station MS to contact the former serving base station BS1, the radio bearers provided for the connection to the mobile station MS are deleted by the former serving base station BS1.

Finally, physical channels are assigned at the new serving base station BS2 for each available bearer. The channel assignments preferably start with the bearer with the tightest delay requirements, approaching to NRT-bearers which optionally get their data buffers from the former serving base station BS1 before initiating transmission.

The physical channel assignment may preferably be started directly after the transmission of the acces grant message.

The physical channel assignment may be accompanied by a transmission of physical slot addresses (ph_addr) and bearer identifiers (bearer_id) for the specific bearers.

In case the bearer identifier (bearer_id) is defined as a part of the link identifier (TLLI2) of the new serving base station BS2, separate link identifiers have to be allocated for each bearer.

However, due to tight delay requirements during handover set-up, it is not possible to use an NRT channel for physical channel assignments. It is thus advantageous to set up a bidirectional RT (Real-Time) channel with low delay, low transmission rate and low BER (Bit Error Rate, e.g. $10^{-3}$), such that each physical channel assignment message can be acknowledged. In case of a missing acknowledgement, the previous message will be retransmitted.

After the assignment of all physical channels, thehandover execution is terminated.

In summary, a method for performing a pre-reserved handover in a mobile communicaton system is suggested, wherein an additional handover preparation step is performed by determining at least one candidate base station in advance, to which handover is likely to be performed. An additional downlink connection to the at least one candidate base station is established before handover execution is performed. Thereby, proper handover can be ensured for cell environments in which a serving cell disappears very quickly from a mobile station.

It should be understood that the above description and accompanying figures are only intended to illustrate the present invention. Thus, the method and apparatus according to the invention may also be used in systems other than the described third generation cellular systems. The preferred embodiment of the invention may vary within the scope of the attached claims.

What is claimed is:

1. A method for performing handover in a mobile communication system, comprising a mobile station, a plurality of base stations, switching means for connecting the base stations, and switching control means for controlling the switching means, the method comprising:

performing a prediction in order to determine at least one candidate base station to which the mobile station is likely to be handed over;

controlling the switching means on the basis of the prediction by the switching control means to set up a connection from the switching means to the at least one candidate base station; and transmitting connection parameters required for a connection with the mobile station to the at least one candidate base station before an access message from the mobile station is transmitted to a new serving base station selected from candidate base stations, in order to execute a handover from a current serving base station to the new serving base station.

2. The method according to claim 1, wherein a determination is performed via a handover prediction based on one of a moving direction and speed of the mobile station.

3. The method according to claim 1, wherein base stations in a line-of-sight of said current serving base station are not determined as candidate base stations.

4. The method according to claim 1, further comprising transmitting a list for identifying a candidate base station to a switching control means.

5. The method according to claim 4, further comprising:

transmitting mobile station connection parameters required for the connection with the mobile station to the switching control means;

setting up a point-to-multipoint connection in a switch to a current serving base station and at least one candidate base station; and transmitting the mobile station connection parameters to at least one candidate base station.

6. The method according to claim 5, further comprising storing downlink user data obtained by the point-to-multipoint connection in at least one candidate base station.

7. The method according to claim 5, further comprising:

transmitting connection parameters for at least one candidate base station to the current serving base station;

checking whether the prediction is still valid; and transmitting candidate base station connection parameters to the mobile station, if the prediction is still valid.

8. The method according to claim 1, further comprising transmitting a connection parameter change information to at least one candidate base station.

9. The method according to claim 8, further comprising:

transmitting a connection parameter version number to a candidate base station to which handover execution is to be performed; and performing a connection parameter update in dependence on the transmitted version number.

10. The method according to claim 8, further comprising deleting a connection between a current serving base station and the mobile station, when a predetermined period expires without any attempt of the mobile station to contact the current serving base station.

11. The system according to claim 10, wherein the serving base station is arranged to determine at least one candidate base station on a basis of one of a moving direction and a speed of the mobile station.

12. The system according to claim 10, wherein storing means are provided in at least one candidate base station for storing downlink user data obtained by the point-to-multipoint connection.

13. The method according to claim 1, wherein the prediction is based on one of a moving direction and a speed of the mobile station.

14. The method according to claim 1, further comprising controlling the switching means by the switching control means to transmit connection parameters required for connection with at least one candidate base station to the current serving base station, and the current serving base station checks whether the prediction is still valid and transmits candidate base station connection parameters to the mobile station if the prediction remains valid.

15. The method according to claim 1, further comprising transmitting connection parameter change information from the current base station to at least one candidate base station.

16. The method according to claim 1, further comprising transmitting a connection parameter version number from the mobile station to a new serving base station to which handover execution is to be performed, and performing a connection parameter update at the new serving base station dependent upon the transmitted version number.

17. The method according to claim 1, further comprising deleting a connection between the current serving base station and the mobile station when a predetermined period expires without any attempt by the mobile station to contact the current serving base station.

18. A system for performing handover in a mobile communication system, comprising a mobile station, a plurality of base stations, switching means for connecting the base stations, and switching control means for controlling the switching means, wherein the plurality of base stations comprise a serving base station currently serving the mobile station, the system further comprising:

the current serving base station is arranged to perform a prediction in order to determine at least one candidate base station to which a mobile station is likely to be handed over;

the switching control means is arranged to receive an information indicating a result of the prediction, to control the switching means to set up a connection from the switching means to the at least one candidate base station, and to transmit connection parameters required for a connection with the mobile station to the at least one candidate base station before an access message from the mobile station is transmitted to a new serving base station selected from the at least one candidate base stations, in order to execute a handover from the current serving base station to the new serving base station.

19. The system according to claim 18, wherein the switching control means determines a candidate base station on a basis of one of a moving direction a speed of the mobile station.

20. The system according to claim 18, wherein the switching means is arranged to set up a point-to-multipoint connection to at least one candidate base station.

21. The system according to claim 20, further comprising storing means provided in at least one candidate base station for storing downlink user data obtained by the point-to-multipoint connection.

22. The system according to claim 18, wherein the switching means is an ATM-switch.

* * * * *